Figure 6:
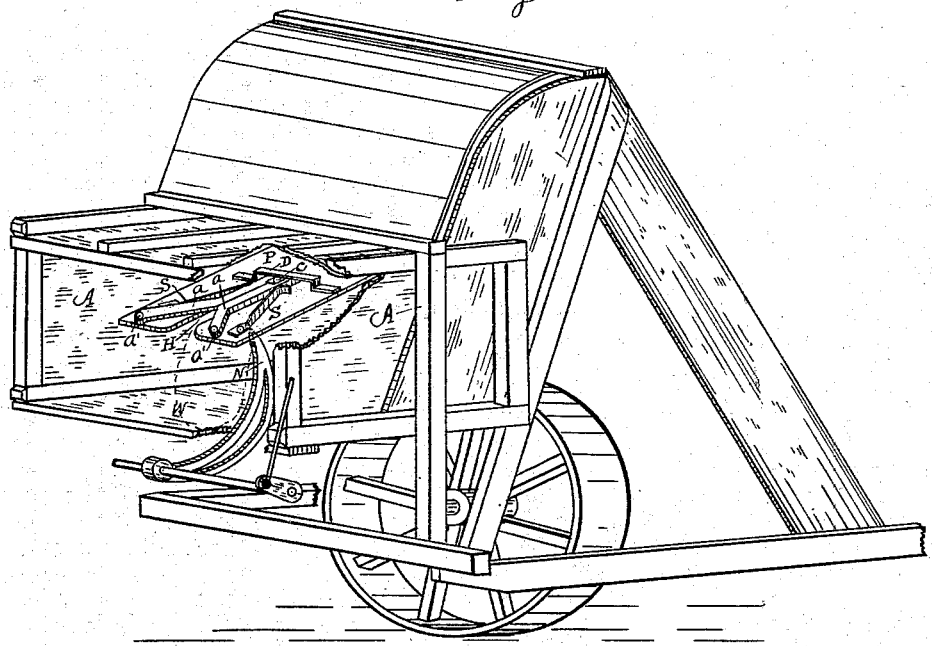

(No Model.) 2 Sheets—Sheet 1.
A. S. CLOW.
GRAIN BINDER.
No. 274,909. Patented Apr. 3, 1883.
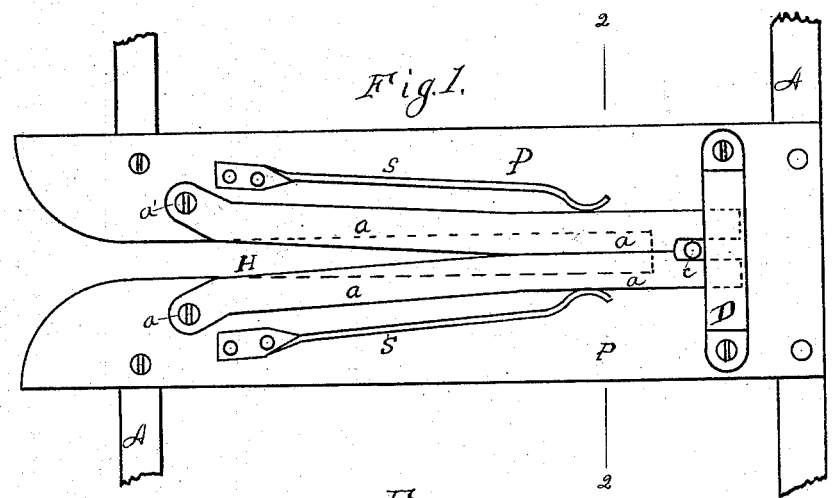
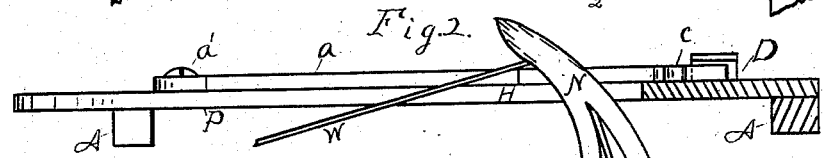
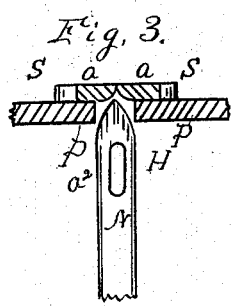
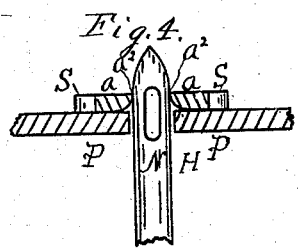
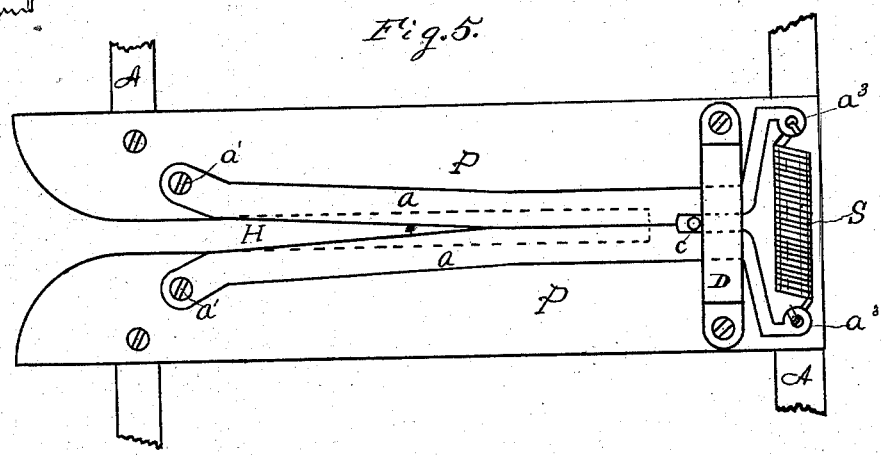
Witnesses.
Thos H. Hutchins
Wm J Hutchins
Inventor.
Adam S. Clow.

(No Model.)

A. S. CLOW.
GRAIN BINDER.

No. 274,909.

2 Sheets—Sheet 2.

Patented Apr. 3, 1883.

Witnesses.
Thos H Hutchins
Wm J Hutchins

Inventor.
Adam S. Clow.

UNITED STATES PATENT OFFICE.

ADAM S. CLOW, OF WHEATLAND, ILLINOIS.

GRAIN-BINDER.

SPECIFICATION forming part of Letters Patent No. 274,909, dated April 3, 1883.

Application filed January 15, 1883. (No model.)

*To all whom it may concern:*

Be it known that I, ADAM S. CLOW, a citizen of the United States of America, residing at Wheatland, in the county of Will and State of Illinois, have invented certain new and useful Improvements in Grain-Binders, of which the following is a specification, reference being had therein to the accompanying drawings.

Figure 1 is a top plan view of the attachment; Fig. 2, a central longitudinal section thereof; Figs. 3 and 4, cross-sections on the line 2 of Fig. 1; Fig. 5, a top plan view of a modification; and Fig. 6, a perspective view, showing the device applied to a harvester.

The object of this invention is to prevent straw from becoming tangled with the point of the needle and twine in that class of harvesters that bind bundles automatically with twine while the machine is performing the operation of carrying the twine around and tying it on a bundle of grain, which has heretofore been a serious objection to the use of twine grain-binders.

Referring to the drawings, A is a portion of the harvester or frame supporting the grain-binder, broken away from the remainder of the machine, which supports the ordinary slotted plate, P, having the slot H, designed to be partially covered by the fingers $a\ a$, as shown in Figs. 1 and 5.

The important feature in this invention consists in the use of the stripping-fingers $a\ a$, which are pivoted at one end to the upper side of the plate P, one on each side of the slot H, by means of screws or bolts $a'\ a'$, and so arranged that their free ends will swing toward each other and meet over the center of the slot H, as shown in Fig. 1, closing or covering the slot H for some little distance. The post or pin $c$ is rigidly fixed to the plate P, near and on a line with the center of the slot H, to prevent the fingers $a$ from passing the center of said slot, the ends of the said fingers being formed with recesses to receive said pin, so as not to prevent their coming in contact with each other, as before stated.

The springs S S are for the purpose of forcing the fingers $a$ against the sides of the needle N as it passes up between them, as shown in Fig. 4, to strip any straw off the needle. These springs S may be flat, as shown in Fig. 1, or a single coil-spring may connect the two fingers, as shown in Fig. 5, as may be desired. The outer ends of the said fingers are held down on the plate P by means of the strap D, under which they vibrate either way far enough to cover and uncover the said slot H, and permit the passage of the needle N up through the said slot between them. The lower inner corners of said fingers are beveled, so the needle will not strike them, but pass up between them, as shown in Figs. 3 and 4.

Heretofore in twine grain-binders of the class where a needle and slotted plate are used the straw, when damp and tough, would sometimes catch on and adhere to the point of the needle and be carried on through the slot and tangle up with the twine, thus seriously interfering with the tying mechanism of the machine, and sometimes prevent the knot from being tied and permitting the bundle to fall from the machine unbound, and also getting straw into the cord-holder of the tying apparatus instead of the twine, and at such times when the twine is cut the needle becomes unthreaded, and necessitates a stop of the machine to thread the machine and remove the straw tangled up in the tying apparatus. All this difficulty is entirely obviated by the use of the fingers $a$, as when the needle is passed up through the slot H it immediately comes in contact with the stripping-fingers $a$, and when straws catch on the said needle-point the pressure of the fingers $a$ against the two sides of the needle will strip it of anything adhering to it and permit it to pass on up through the slot clean; and it will be observed from the peculiar form of the stripping-fingers that they will strip the needle while it is passing through the entire length of the slot H, thus preventing any straw from being carried above the plate P to become tangled with the twine and that portion of the machine that ties the knot, bringing nothing in the way of the cord-holder of the tying apparatus but the twine, leaving the twine free from straw to be grasped and held ready to be tied around the bundle. If but one stripping-finger were used, it would not perform the function the two will together, as the two will vibrate to or from each other and follow the needle as it vibrates sidewise. If one finger were rigid, or if dispensed with, and the side of the slot used for stripping purposes, the object would not be accomplished, as the vibration of the needle sidewise, occasioned by the jolting and jar of the harvester as it travels, would carry the needle away from any stationary stripping device and permit it to carry straw through with the twine.

Having thus described my invention, what I claim as new, and desire to secure by Letters Patent, is as follows, to wit:

1. In a grain-binder for harvesters, the combination of the fingers *a a*, springs S S, and plate P, having the slot H, all adapted to operate as and for the purpose set forth.

2. In a grain-binder for harvesters, the combination of the fingers *a a*, springs S S, plate P, having the slot H, pin *c*, and needle N, all adapted to operate as and for the purpose set forth.

In testimony whereof I affix my signature, in presence of two witnesses, this 10th day of January, 1883.

ADAM S. CLOW.

Witnesses:
   THOS. H. HUTCHINS,
   ROBERT CLOW.